May 5, 1964     I. M. ENGSTROM     3,131,510

PLANT STARTER

Filed April 3, 1959

Irene M. Engstrom
INVENTOR.

BY *Clarence A. O'Brien*
*and Harvey B. Jacobson*
Attorneys 3,131,510
PLANT STARTER
Irene M. Engstrom, 118 10th Ave. W., Alexandria, Minn.
Filed Apr. 3, 1959, Ser. No. 803,936
2 Claims. (Cl. 47—41)

This invention relates to a device to facilitate starting plants from leaves or slips taken from growing plants.

An object of the invention is to provide a device which is adapted to be placed on a glass or other vessel containing water and the leaf or slip may be suspended so as to be properly submersed in the water.

Although the plant starter is best adapted for use with starting new plants of African violets or Gloxinias, both of which are started from immersing the stem of a leaf taken from a live plant in water until the roots are formed, it is to be understood that the starting device may be used with other slips or leaves. After the slip or leaf has begun to root in the water, it is removed and planted in soil.

If the leaf becomes immersed in water, it begins to rot and the plant will not grow. By the use of the starter in accordance with the invention the leaf may be suspended over the water in such a way that only the stem portion hangs into the water and the leafy part of the leaf is suspended above it, thereby entirely eliminating the possibility of the leaf falling into the water and becoming spoiled.

A more specific object of the invention is to provide a plant starter consisting essentially of a wall supported horizontally within a vessel, the wall having a number of openings therein by which to individually support leaves, or other slips of plants, with the leafy portion located above the wall and the stem portion located beneath the wall so that it may be immersed in water.

These together with other objects and advantages which will become subsequently apparent reside in the details of construction and operation as more fully hereinafter described and claimed, reference being had to the accompanying drawings forming a part hereof, where like numerals refer to like parts throughout, and in which:

Figure 1:
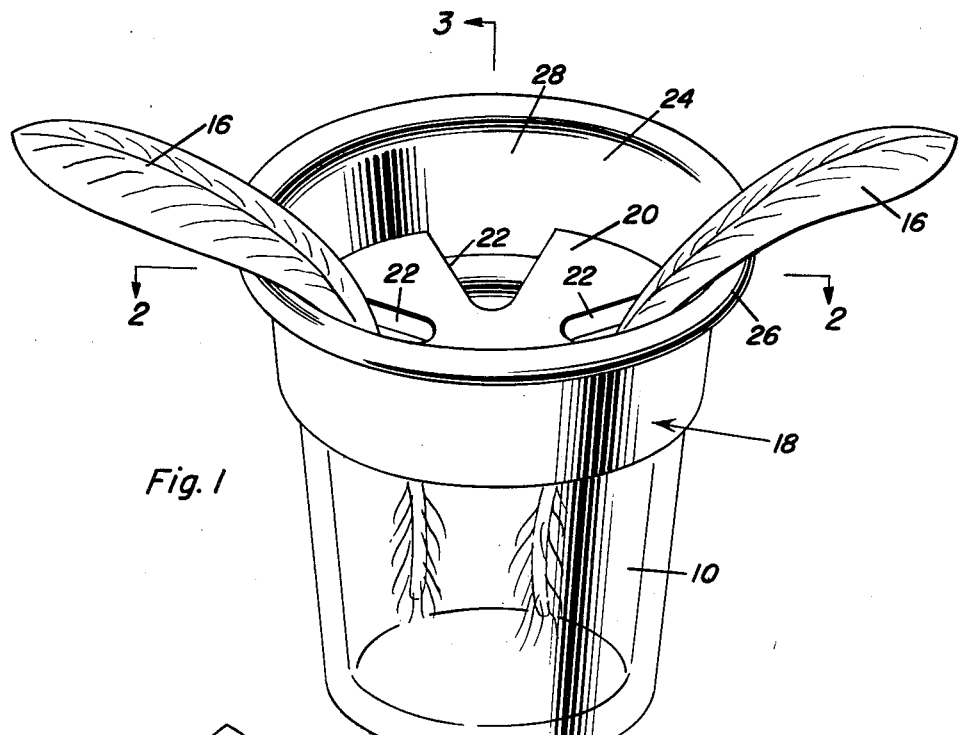
FIGURE 1 is a perspective view of the starter disposed in a vessel.

In the accompanying drawings there is a vessel 10 which may be a glass or any other vessel suitable for the purpose. The vessel is adapted to contain water 12 within which the stem portions 14 of slips 16 are disposed. The slips in the illustration are ovate leaves although it is to be understood that other types of slips may be used to advantage with starter 18.

Starter 18 consists of a disk or wall 20 having a plurality of openings 22 extending thereinto from the periphery thereof. There are four openings in the drawing, but it is to be understood that this number may be increased or reduced. It is recommended that each opening accommodate a single slip but here again, this is an alternative within the prerogative of the user.

The starter device wall 20 is held mounted in an approximately horizontal position above the upper edge of vessel 10 by means of a structural support such as collar 24. The collar is in the shape of a truncated cone and has an upper peripheral bead 26 which forms a rest for the upper part of each slip. Wall 20 is fixed within the passage 28 of collar 24 at a position spaced from the upper and lower edges of the collar. The lower part of collar 24 fits around the upper edge of vessel 10 so that device 18 is easily removed from the vessel from time to time for adding water, without danger of wetting the upper part of any leaf in device 18.

Figures 2, 3:
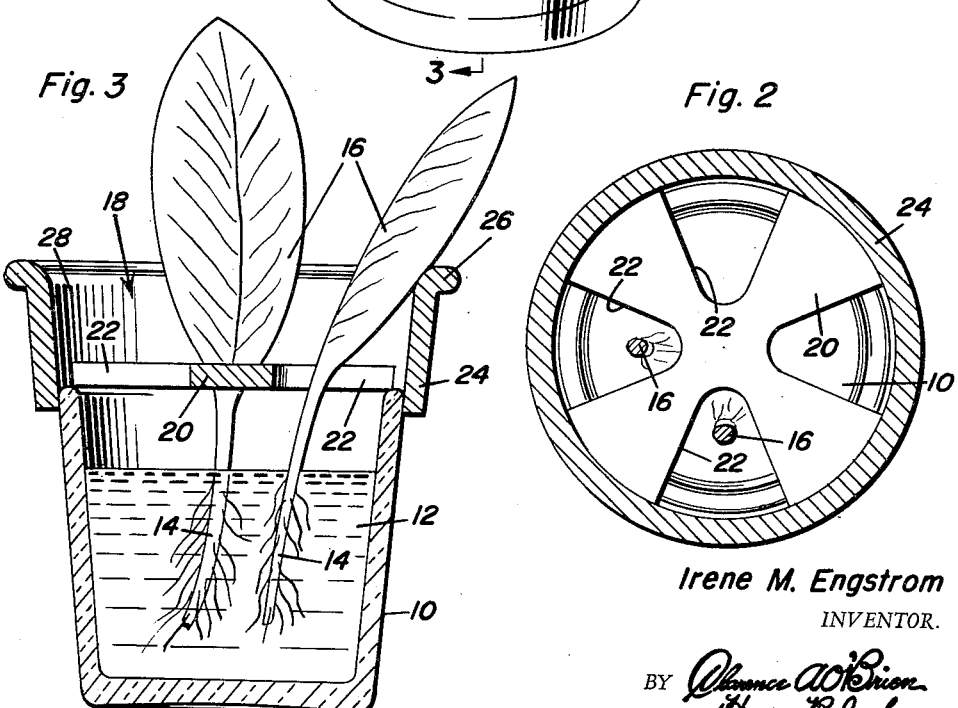
FIGURE 2 is a sectional view taken on the line 2—2 of FIGURE 1.
FIGURE 3 is a sectional view taken on the line 3—3 of FIGURE 1.

Device 18 may be made of any material, for example, metal, wood, plaster, plastic or any other substance that may be formed into the correct shape. For most satisfactory results in the use of the starter 18, only one leaf is placed in each of the openings 22. Further, the openings are approximately triangular or V-shaped, and the normal position for the leaf is at rest against bead 26 and lightly wedged at the upper edge of the crotch of an opening 22 (FIGURE 3) thereby keeping the stem 14 completely immersed and the leafy part of the slip well spaced from the water level until sufficient roots have been developed to transplant the slip.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use on a circular, open top vessel adapted to contain water, a starter for slips of the type including a stem and a generally ovate leaf thereon, said starter comprising a downwardly tapered circular collar adapted to encircle the upper portion of the vessel, and a disk fixed horizontally in an intermediate portion of the collar and adapted to seat on the vessel for supporting said collar thereon, said disk having extending thereinto from the periphery thereof a plurality of generally V-shaped, radial openings for the passage of the stems and closed at their inner ends and adapted to wedgingly receive intermediate portions of the slips, the side walls of the openings being outwardly divergent and engageable beneath the leaves for supporting same with the stems suspended in the vessel.

2. A starter for slips of the type comprising a stem and a substantially ovate leaf thereon, said starter comprising, an open top liquid receptacle, a horizontal disk removably mounted on the top of the receptacle, said disk having therein a plurality of essentially V-shaped openings extending radially thereinto from the periphery thereof for the passage of the stems into the receptacle and for wedgingly receiving the slips at the juncture of the stems and leaves, the side walls of the openings being outwardly divergent and engageable beneath the leaves for supporting the slips with the stems thereof suspended in the liquid, and means for supporting the slips at an inclination on the disk and wedging said slips in the openings, said means comprising a ring affixed to the periphery of the disk and extending upwardly therefrom for engagement beneath the leaves, said ring being substantially frusto-conical and extending below the disk and encircling the receptacle for removably securing the disk thereon.

References Cited in the file of this patent

UNITED STATES PATENTS

| 620,150 | Kitchen | Feb. 28, 1899 |
| 1,539,153 | Bennett | May 26, 1925 |
| 2,005,467 | Menge | June 18, 1935 |
| 2,900,760 | Tupper | Aug. 25, 1959 |

FOREIGN PATENTS

| 1,067,922 | France | Feb. 3, 1954 |
| 1,156,204 | France | Dec. 9, 1957 |
| 344,032 | Great Britain | Mar. 2, 1931 |